(12) United States Patent
Whitman et al.

(10) Patent No.: US 11,205,292 B1
(45) Date of Patent: Dec. 21, 2021

(54) AUGMENTED REALITY VISUALIZATION OF SOUNDWAVES

(71) Applicant: INTERNATIONAL BUSINESS MACHINES CORPORATION, Armonk, NY (US)

(72) Inventors: Todd Russell Whitman, Bethany, CT (US); Zachary A. Silverstein, Austin, TX (US); Sarbajit K. Rakshit, Kolkata (IN); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/109,245

(22) Filed: Dec. 2, 2020

(51) Int. Cl.
*G06T 13/20* (2011.01)
*G06T 19/00* (2011.01)

(52) U.S. Cl.
CPC .......... *G06T 13/205* (2013.01); *G06T 19/006* (2013.01)

(58) Field of Classification Search
CPC ..... G06T 13/205; G06T 19/006; G06T 11/60; G06F 3/165; G06F 1/1632; G06F 16/24578; G06F 16/433; H04N 21/4394; H04N 21/4307; H04N 21/8545; H04S 1/007; G06K 9/00664; G06Q 30/0261; H04R 5/04; H04R 2499/11; H04R 2420/01; H04R 29/004
See application file for complete search history.

(56) References Cited

U.S. PATENT DOCUMENTS

| | | | |
|---|---|---|---|
| 8,018,329 B2 | 9/2011 | Morgan | |
| 9,043,329 B1 | 5/2015 | Patton | |
| 10,094,855 B1 | 10/2018 | Fuhr | |
| 10,976,999 B1* | 4/2021 | Browy | H04R 1/406 |
| 2005/0017181 A1 | 1/2005 | Kearfott | |
| 2011/0043515 A1 | 2/2011 | Stathis | |
| 2013/0099977 A1 | 4/2013 | Sheshadri | |
| 2014/0164118 A1 | 6/2014 | Polachi | |

(Continued)

OTHER PUBLICATIONS

Adee, "Your home's online gadgets could be hacked by ultrasound", New Scientist, Technology, https://www.newscientist.com/article/2110762-your-homes-online-gadgets-could-be-hacked-by-ultrasound/, Oct. 28, 2016, 5 pages.

(Continued)

*Primary Examiner* — Xilin Guo
(74) *Attorney, Agent, or Firm* — Michael O' Keefe, Esq.; Kevin P. Radigan, Esq.; Heslin Rothenberg Farley & Mesiti P.C.

(57) ABSTRACT

A method, computer system, and computer program product for augmented reality sound visualization is provided. The embodiment may include capturing soundwave data from one or more sensors. The embodiment may also include determining if an emitted soundwave associated with the captured soundwave data is injurious to a user. The embodiment may further include, in response to determining the emitted soundwave is injurious to the user, generating an overlay for an augmented reality device that visualizes the captured soundwave data. The embodiment may also include displaying the overlay in an augmented reality environment based on the user satisfying a threshold distance to the emitted soundwave.

17 Claims, 5 Drawing Sheets

(56) References Cited

U.S. PATENT DOCUMENTS

| | | | |
|---|---|---|---|
| 2014/0357295 A1 | 12/2014 | Skomra | |
| 2015/0109338 A1 | 4/2015 | McKinnon | |
| 2015/0294506 A1 | 10/2015 | Bare | |
| 2016/0142830 A1 | 5/2016 | Hu | |
| 2016/0381053 A1 | 12/2016 | Taboso Ballesteros | |
| 2017/0039767 A1 | 2/2017 | Lanier | |
| 2017/0061690 A1 | 3/2017 | Laughlin | |
| 2017/0188173 A1 | 6/2017 | Ranieri | |
| 2019/0385373 A1 | 12/2019 | Mittleman | |
| 2020/0046595 A1* | 2/2020 | Kline | G01C 21/3652 |
| 2020/0257493 A1* | 8/2020 | Denton | G06F 3/165 |
| 2021/0158685 A1* | 5/2021 | Bernotas | G08B 29/185 |

OTHER PUBLICATIONS

Cooper, "Scientists prove ultrasound-whispering malware concept", ITProPortal, Dec. 4, 2013, https://www.itproportal.com/2013/12/04/scientists-prove-ultrasound-whispering-malware-concept/, 10 pages.

Kuksov, "Voice assistants hear things we don't", Kaspersky, Feb. 5, 2019, [accessed Nov. 23, 2020], 10 Pages. Retrieved from the Internet: <https://www.kaspersky.co.in/blog/ultrasound-attacks/15196/, Feb. 5, 2019>.

Mann, "Surveillance (oversight), Sousveillance (undersight), and Metaveillance (seeing sight itself)", 2016 IEEE Conference on Computer Vision and Pattern Recognition Workshops, pp. 1408-1417.

marketwatch.com, "Virtual and Augmented Reality Market is Expected to Exceed US$ 117 Billion by 2022", Press Release, Published: Jul. 26, 2018, 5 pages, [accessed Mar. 12, 2020], Retrieved from the Internet: <https://www.marketwatch.com/press-release/virtual-and-augmented-reality-market-is-expected-to-exceed-US-117-billion-by-2022-2018-07-26>.

Marks, "Can a computer virus communicate via your speakers?", New Scientist, Technology, Nov. 14, 2013, https://www.newscientist.com/article/dn24582-can-a-computer-virus-communicate-via-your-speakers/, 5 pages.

Mell et al., "The NIST Definition of Cloud Computing", National Institute of Standards and Technology, Special Publication 800-145, Sep. 2011, 7 pages.

Ozhiganov, "Ultrasound Data Transferring Between Mobile Devices", Azoft.com, https://www.azoft.com/blog/nfc-alternative-ultrasound/, Oct. 9, 2016, 14 pages.

Seals, "RSA Conference 2019: Ultrasound Hacked in Two Clicks", Threat Post, https://threatpost.com/ultrasound-hacked/142601/, Mar. 7, 2019, 7 pages.

Sinha, "Ultrasound Machines are Vulnerable to Hacking", EnterpriseTalk, Mar. 12, 2019, https://enterprisetalk.com/news/ultrasound-machines-are-vulnerable-to-hacking/, 1 page.

Takano, "Silent Sound (Infrasound) Can Make You Physically Ill", Pyro-Energen, https://www.pyroenergen.com/articles09/infrasound-effects.htm, accessed on Mar. 12, 2020, 19 pages.

Vincent, "Inaudible ultrasound commands can be used to secretly control Siri, Alexa, and Google Now", The Verge, Sep. 7, 2017, 4 pages, [accessed Mar. 12, 2020], Retrieved from the Internet: <https://www.theverge.com/2017/9/7/16265906/ultrasound-hack-siri-alexa-google>.

Widman, "AR and VR bring a new twist to collaboration", Computerworld, Jan. 3, 2019, https://www.computerworld.com/article/3329746/ar-and-vr-bring-a-new-twist-to-collaboration.html, 4 pages.

* cited by examiner

AUGMENTED REALITY VISUALIZATION OF SOUNDWAVES

BACKGROUND

The present invention relates generally to the field of computing, and more particularly to augmented reality.

Augmented reality relates to technology that modifies a direct or indirect user view of a real-world environment with computer-generated elements using various inputs, such as sound data, image data, or location data. Various technologies may be implemented when utilizing augmented reality, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

SUMMARY

According to one embodiment, a method, computer system, and computer program product for augmented reality sound visualization is provided. The embodiment may include capturing soundwave data from one or more sensors. The embodiment may also include determining if an emitted soundwave associated with the captured soundwave data is injurious to a user. The embodiment may further include, in response to determining the emitted soundwave is injurious to the user, generating an overlay for an augmented reality device that visualizes the captured soundwave data. The embodiment may also include displaying the overlay in an augmented reality environment based on the user satisfying a threshold distance to the emitted soundwave.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
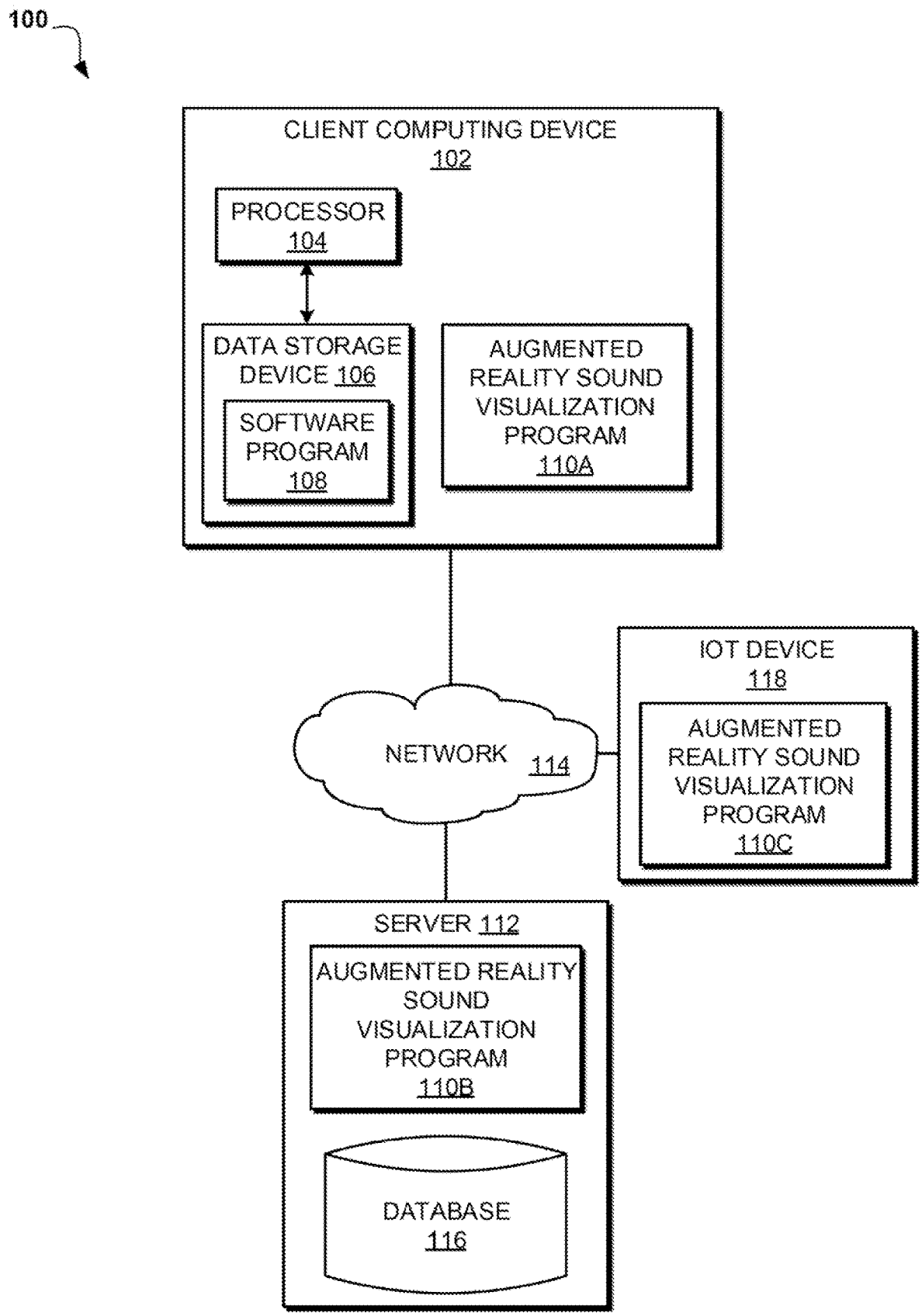
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to augmented reality. The following described exemplary embodiments provide a system, method, and program product to, among other things, utilize an augmented reality device to actively visualize boundaries where infrasound waves and/or ultrasound waves are detected within common spaces. Therefore, the present embodiment has the capacity to improve the technical field of augmented reality by utilizing sound receivers to map and visualize the source and extent of malicious soundwaves and visualize the soundwaves within an augmented reality system so as to allow a user to avoid exposure.

As previously described, augmented reality relates to technology that modifies a direct or indirect user view of a real-world environment with computer-generated elements using various inputs, such as sound data, image data, or location data. Various technologies may be implemented when utilizing augmented reality, such as eyeglasses, head-mounted displays, head-up displays, contact lenses, virtual reality displays, and handheld displays. Augmented reality may have numerous applications within society including uses in literature, architecture, visual art, education, emergency management, video gaming, medicine, military, navigation, tourism, language translation, and music production.

Specific soundwaves can detrimentally affect humans. Ultrasound relates to soundwaves with frequencies higher than the upper audible limit of human hearing. Ultrasound is not distinguishable from audible sound in its physical properties other than being inaudible to human beings. The upper limit at which human beings are capable of hearing sound varies from person-to-person but, approximately, is measured at 20 kilohertz (kHz) (20,000 hertz) in healthy young adults. Ultrasound devices operate with frequencies from 20 kHz up to several gigahertz (GHz).

Distinguishable from yet similar to ultrasound, infrasound relates to soundwaves that are below the lower audible limit of human hearing. Again, the lower limit at which human beings are capable of hearing sound varies from person-to-person but is generally measured around 20 hertz (Hz).

When measuring soundwaves across the audible (i.e., acoustic), infrasound, and ultrasound spectrums, electronic devices, such as artificial intelligence assistant systems, capture soundwaves through sensors, such as microphones. Microphone sensitivity on a device could allow for data and command transfer to be received via infrasound and ultrasound concurrently to receiving audible sounds without user knowledge or inconvenience. While ultrasound is the predominant sound signal method of data transfer, it must operate in a relatively limited distance from an artificial device to transfer data.

Infrasound could also be used to transmit signals as its properties allow for the ability to persist for hundreds of miles and through impediments, such as walls, geographical terrains, and certain man-made obstacles, with seemingly minimal signal loss. Despite its perceived benefits, infrasound may also have harmful effects. As such, it may be advantageous to, among other things, capture soundwaves across the infrasound, acoustic, and ultrasound spectrums and display a virtual boundary within an augmented reality system to alert the user of unwanted exposure.

According to at least one embodiment, sound data may be gathered by a user augmented reality device from nearby sound capturing sensors in order to map a visual boundary of emanating soundwave sources. The emanating soundwaves may be analyzed to determine are malicious or harmful to the user and, if so, such harm may be marked on the visual boundary. When a user wearing an augmented reality device satisfies a distance threshold to a malicious soundwave source, the user may be alerted to the presence and source of the malicious soundwave through the display of the visual boundary on a display screen of the augmented reality device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to capture and analyze soundwaves within the infrasound, acoustic, and ultrasound spectrums and visually display the soundwaves determined to be malicious to humans on an augmented reality device display screen in order to alert a user of the presence of the malicious soundwaves.

Referring to FIG. 1, an exemplary networked computer environment 100 is depicted, according to at least one embodiment. The networked computer environment 100 may include client computing device 102, a server 112, and an Internet of Things (IoT) device 118 interconnected via a communication network 114. According to at least one implementation, the networked computer environment 100 may include a plurality of client computing devices 102, servers 112, and IoT devices 118, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Figure 4:
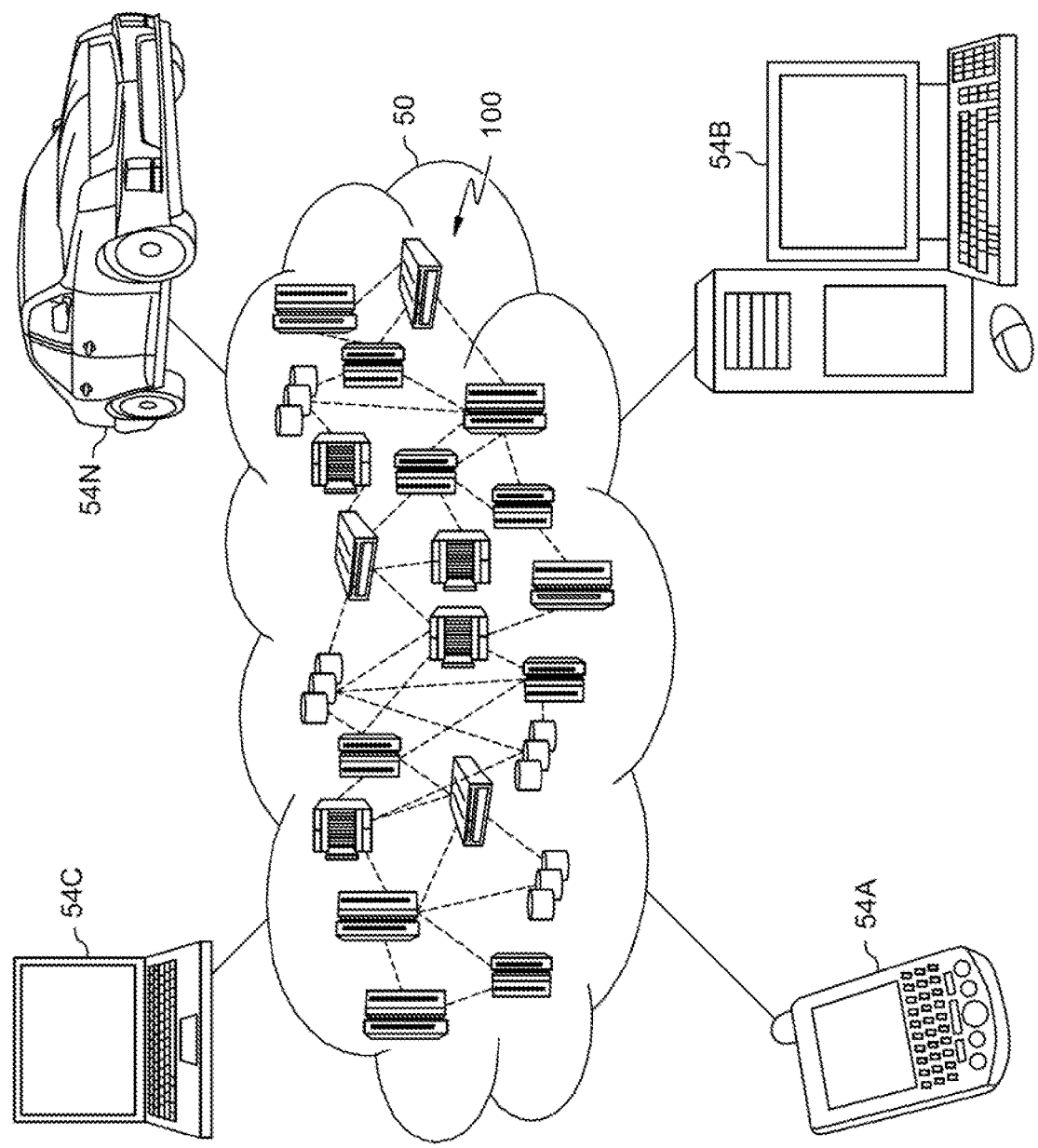
FIG. 4 depicts a cloud computing environment according to an embodiment of the present invention.

Client computing device 102 may include a processor 104 and a data storage device 106 that is enabled to host and run a software program 108 and an augmented reality sound visualization program 110A and communicate with the server 112 and the IoT device 118 via the communication network 114, in accordance with one embodiment of the invention. Client computing device 102 may be, for example, an augmented reality device, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an augmented reality sound visualization program 110B and a database 116 and communicating with the client computing device 102 and IoT device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

In at least one embodiment, the IoT device 118 may be any computing device capable of hosting an augmented reality sound visualization program 110C and communicating with the client computing device 102 and the server 112 via the network 114. The IoT device 118 may be communicatively coupled, either internally or externally, to one or more sound capture devices, such as a microphone. In at least one other embodiment, the IoT device 118 may be an artificial intelligence (AI) assistant-enabled device capable of capturing soundwaves emitted from nearby sources within a threshold distance.

According to the present embodiment, the augmented reality sound visualization program 110A, 110B, 110C may be a program capable of capturing soundwaves using onboard sensors or receiving soundwave data captured by one or more IoT devices, such as IoT device 118. The augmented reality sound visualization program 110A, 110B, 110C may also be capable of analyzing soundwave data to determine maliciousness to users. The augmented reality sound visualization program 110A, 110B, 110C may generate a visual representation of the soundwave data illustrating the boundaries of soundwaves for display on an augmented reality device, such as client computing device 102. In at least one embodiment, the augmented reality sound visualization program 110A, 110B, 110C may display all soundwave boundaries on the augmented reality device and alter a color of the displayed boundary based on the determined maliciousness of the soundwave data. In at least one other embodiment, the augmented reality sound visualization program 110A, 110B, 110C may only display soundwave boundaries for soundwaves that have an associated maliciousness satisfying a threshold danger to the user. The augmented reality sound visualization method is explained in further detail below with respect to FIG. 2.

Figure 2:
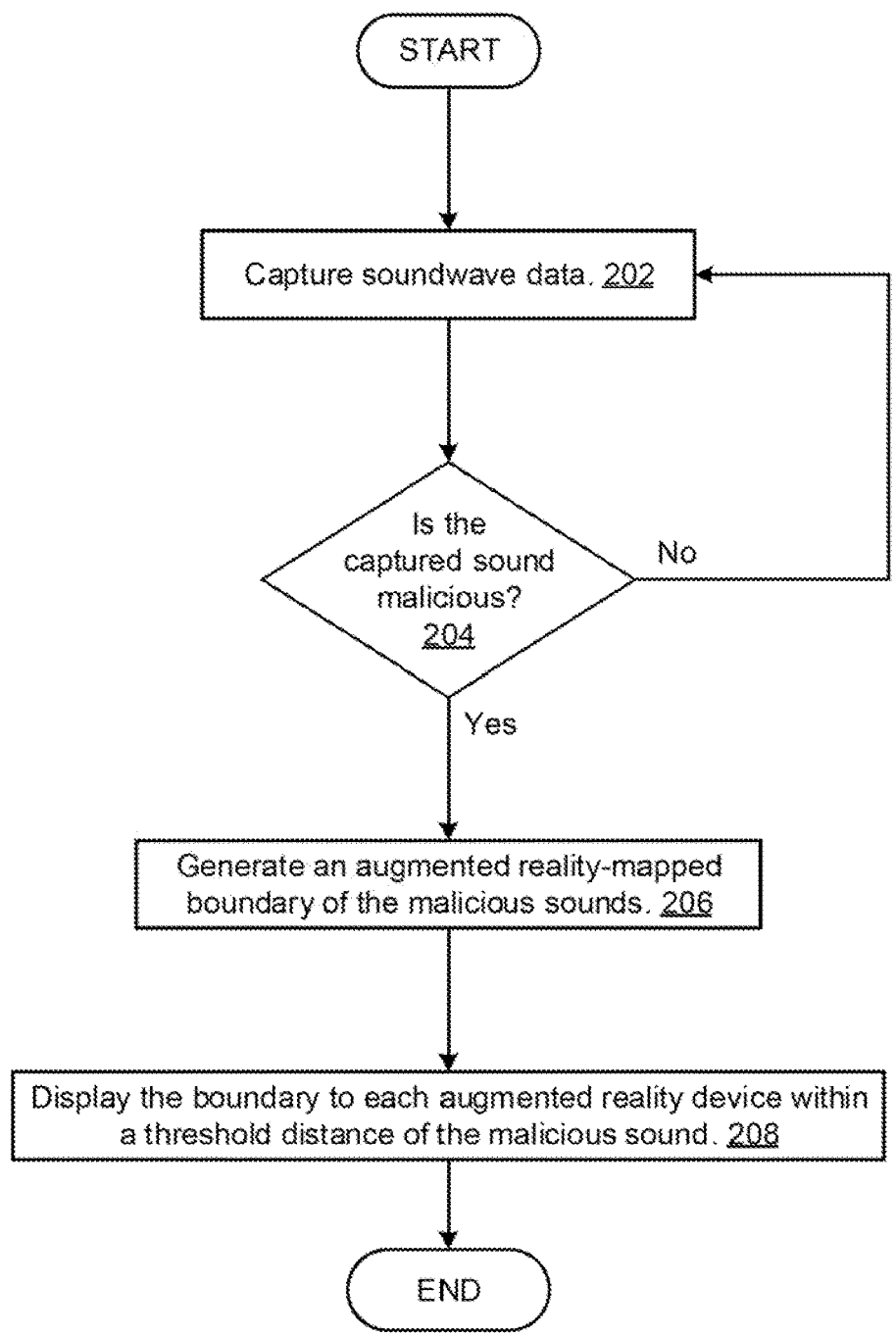
FIG. 2 illustrates an operational flowchart for an augmented reality sound visualization process according to at least one embodiment.

Referring now to FIG. 2, an operational flowchart illustrating an augmented reality sound visualization process 200 is depicted according to at least one embodiment. At 202, the augmented reality sound visualization program 110A, 110B, 110C captures soundwave data. In at least one embodiment, the augmented reality sound visualization program 110A, 110B, 110C may gather soundwave data from onboard sensors and/or surrounding devices installed within a pre-configured threshold distance to identify if any surrounding area is emanating infrasound, acoustic, or ultrasound waves. In at least one embodiment, the sensors utilized by the augmented reality sound visualization program 110A, 110B, 110C may be distributed within either a private space, such as a user's home or an office building, or a public space, such as a shopping center, airport, train station, or municipal park. For example, the augmented reality sound visualization program 110A, 110B, 110C may have sensors, such as an array of sound wave receivers, strategically installed around a public park to allow the capture of infrasound and ultrasound waves. In at least one other embodiment, the augmented reality sound visualization program 110A, 110B, 110C may only capture the magnitude of an emitted soundwave and any data needed to identify the source of the sound way rather than any information that can identify content of the captured soundwave, such as words spoken if the captured soundwave emanates from a person speaking.

In at least one embodiment, when captured, the augmented reality sound visualization program 110A, 110B, 110C may identify, through classification of measured frequency, whether a captured soundwave is in the infrasound spectrum, acoustic spectrum, or ultrasound spectrum. As previously described, the infrasound spectrum may refer to all soundwaves with a measured frequency below 20 Hz, the ultrasound spectrum may relate to all soundwaves with a measured frequency above 20 kHz, and the acoustic spectrum may relate to all soundwaves with a measured frequency between 20 Hz and 20 kHz.

Next, at 204, the augmented reality sound visualization program 110A, 110B, 110C determines whether the captured soundwaves are malicious. A malicious soundwave may be classified as a soundwave that may be injurious to human health, such as inhibiting motor functions or causing hearing loss, or disruptive to communication systems, such as interfering frequencies or cyberattacks on MEMS accelerometers. The augmented reality sound visualization program 110A, 110B, 110C may determine soundwaves are malicious when the measured frequency of a soundwave satisfies a threshold value. For example, for infrasound waves, a captured wave may be deemed malicious if the frequency is below a threshold value. Similarly, for ultrasound waves, a captured wave may be deemed malicious if the frequency is above a threshold value. Additionally, each wave spectrum (i.e., infrasound, acoustic, and ultrasound), maliciousness may also be determined based on the volume or intensity of the soundwaves being emitted. In an example of a cyberattack, the augmented reality sound visualization program 110A, 110B, 110C may determine maliciousness based on a specific pattern of the captured soundwaves. If the augmented reality sound visualization program 110A, 110B determines a soundwave is not malicious (step 204, "No" branch), then the augmented reality sound visualization process 200 may return to step 202 to continue capturing soundwave data. If the augmented reality sound visualization program 110A, 110B, 110C determines a soundwave is malicious (step 204, "Yes" branch), then the augmented reality sound visualization process 200 may proceed to step 206 to generate an augmented reality-mapped boundary of the malicious sound.

In at least one embodiment, the augmented reality sound visualization program 110A, 110B, 110C may determine that a soundwave is malicious based on historical analysis of known wave patterns. For example, the augmented reality sound visualization program 110A, 110B, 110C may compare a captured soundwave profile against a database of known malicious soundwaves. If the profile of a captured soundwave matches the profile of a soundwave within a repository, such as database 116, the augmented reality sound visualization program 110A, 110B, 110C may determine the captured soundwave is malicious.

Next, at 206, in response to determining a captured soundwave is malicious, the augmented reality sound visualization program 110A, 110B, 110C generates an augmented reality-mapped boundary of the malicious sound. Once a malicious soundwave has been determined, the augmented reality sound visualization program 110A, 110B, 110C may utilize the captured data to construct an overlay for an augmented reality device, such as client computing device 102, so the malicious soundwave can be visualized within the area surrounding the user. The augmented reality sound visualization program 110A, 110B, 110C may render three-dimensional points and join the rendered points using an animation engine to generate the overlay. The visual overlay may highlight areas where malicious soundwaves are present. In at least one embodiment, the augmented reality sound visualization program 110A, 110B, 110C may display all soundwave sources and assign a color code to each source based on the maliciousness and/or intensity of the emanating sound wave. For example, an intense ultrasound wave may be represented by red due to possible danger to the user upon exposure. Conversely, rustling leaves may be represented in green due to minimal risk to the user upon exposure. Additionally, the opaqueness of the color may be increased as the visualization proceeds toward the source of the sound. For example, at the source of the soundwave, the visualization may depict a solid color but, at the edge of the visualization, the displayed color may be highly transparent. Furthermore, the augmented reality sound visualization program 110A, 110B, 110C may display informative metadata represented numerically or as characters on the visualization, such as originating direction, soundwave type, intensity, volume, and possible source.

In at least one other embodiment, the augmented reality sound visualization program 110A, 110B, 110C may depicted the boundary of the visualization for each soundwave based on the distance from the source of the soundwave a user may be before the soundwave becomes malicious or injurious. For example, if a user may be within 100 feet of an emanating infrasound wave before the soundwave can be injurious to the user, then the augmented reality sound visualization program 110A, 110B, 110C may depict the visual boundary of the visualization with a 100 foot radius from the soundwave source. Furthermore, the augmented reality sound visualization program 110A, 110B, 110C may consider the sensitivities of a user when calculating the affect of a malicious soundwave on a user. For example, if the user has an impairment that results in a sensitivity to sounds, the augmented reality sound visualization program 110A, 110B, 110C may depict the boundary of the visualization further from the source that would be represented for an individual without such sensitivities.

Then, at 208, the augmented reality sound visualization program 110A, 110B, 110C displays the boundary to each augmented reality device within a threshold distance of the malicious sound. Once the visualization overlay has been created, the augmented reality sound visualization program 110A, 110B, 110C may process the overlay into a display screen of an augmented reality device, such as a client computing device 102. The augmented reality sound visualization program 110A, 110B, 110C may allow all augmented reality devices connected to the data source, either wired or wirelessly, to observe the quadrant of malicious activity within the overlay so the user opt in.

In at least one embodiment, the augmented reality sound visualization program 110A, 110B, 110C may display the overlay whenever a malicious soundwave is initially detected within a preconfigured distance from the user. However, in at least one other embodiment, the augmented reality sound visualization program 110A, 110B, 110C may only display the visualization overlay when the user has initiated the augmented reality sound visualization program 110A, 110B, 110C.

In at least one other embodiment, the augmented reality sound visualization program 110A, 110B, 110C may calculate a safe and recommended path for a user to traverse in the presence of a malicious soundwave using a global positioning system (GPS) and pathing. The augmented reality sound visualization program 110A, 110B, 110C may display the route of the suggested path on the display screen of the augmented reality device. For example, the path may appear as a directional line and/or as a set of navigational directions.

In yet another embodiment, the augmented reality sound visualization program 110A, 110B, 110C may provide guidance to a user already within a boundary of a malicious soundwave. For example, a soundwave begins emanating while the user is already within the boundary of maliciousness, the augmented reality sound visualization program 110A, 110B, 110C may begin communicating with the augmented reality device any guidance as to appropriate steps to leave the malicious boundary, such as displaying a visual path as to the quickest path away from the source or vocal steps as to how the user may increase distance from the source until the user exits the malicious boundary. Additionally, when the augmented reality sound visualization program 110A, 110B, 110C detects a user is within the boundary of a malicious soundwave, the augmented reality sound visualization program 110A, 110B, 110C may begin communicating with user devices to identify what actions are occurring within the user devices in an attempt to thwart a sound-based cyberattack on user device within the user's possession. The augmented reality sound visualization program 110A, 110B, 110C may instruct each user device to communicate an execution log so as to allow the augmented reality sound visualization program 110A, 110B, 110C to provide appropriate steps for defense or recovery of any compromised program or data.

It may be appreciated that FIG. 2 provides only an illustration of one implementation and does not imply any limitations with regard to how different embodiments may be implemented. Many modifications to the depicted environments may be made based on design and implementation requirements. In at least one embodiment, the augmented reality sound visualization program 110A, 110B, 110C may utilize multiple sensors to gather soundwave data. Using multiple sensors may allow the augmented reality sound visualization program 110A, 110B, 110C to identify the source of a malicious soundwave through triangulation. Furthermore, once a malicious soundwave has been identified, the augmented reality sound visualization program 110A, 110B, 110C may continually capture soundwave data in order to track a source of the malicious soundwave since the source may change locations over time. In at least one embodiment, the augmented reality sound visualization program 110A, 110B, 110C may transmit a notification to an authority, such as a police department, should a malicious source and soundwave meeting preconfigured criteria. For example, if the augmented reality sound visualization program 110A, 110B, 110C determines a malicious source is likely to be a soundwave attack intended on causing harm to humans or communication networks based on the characteristics of the emitted soundwaves, the augmented reality sound visualization program 110A, 110B, 110C may transmit a notification to an authority on the wave characteristics and emanating source.

In at least one other embodiment, the augmented reality sound visualization program 110A, 110B, 110C may allow for crowdsourcing of sound data and other related data point through opted-in user devices or social programs.

Figure 3:
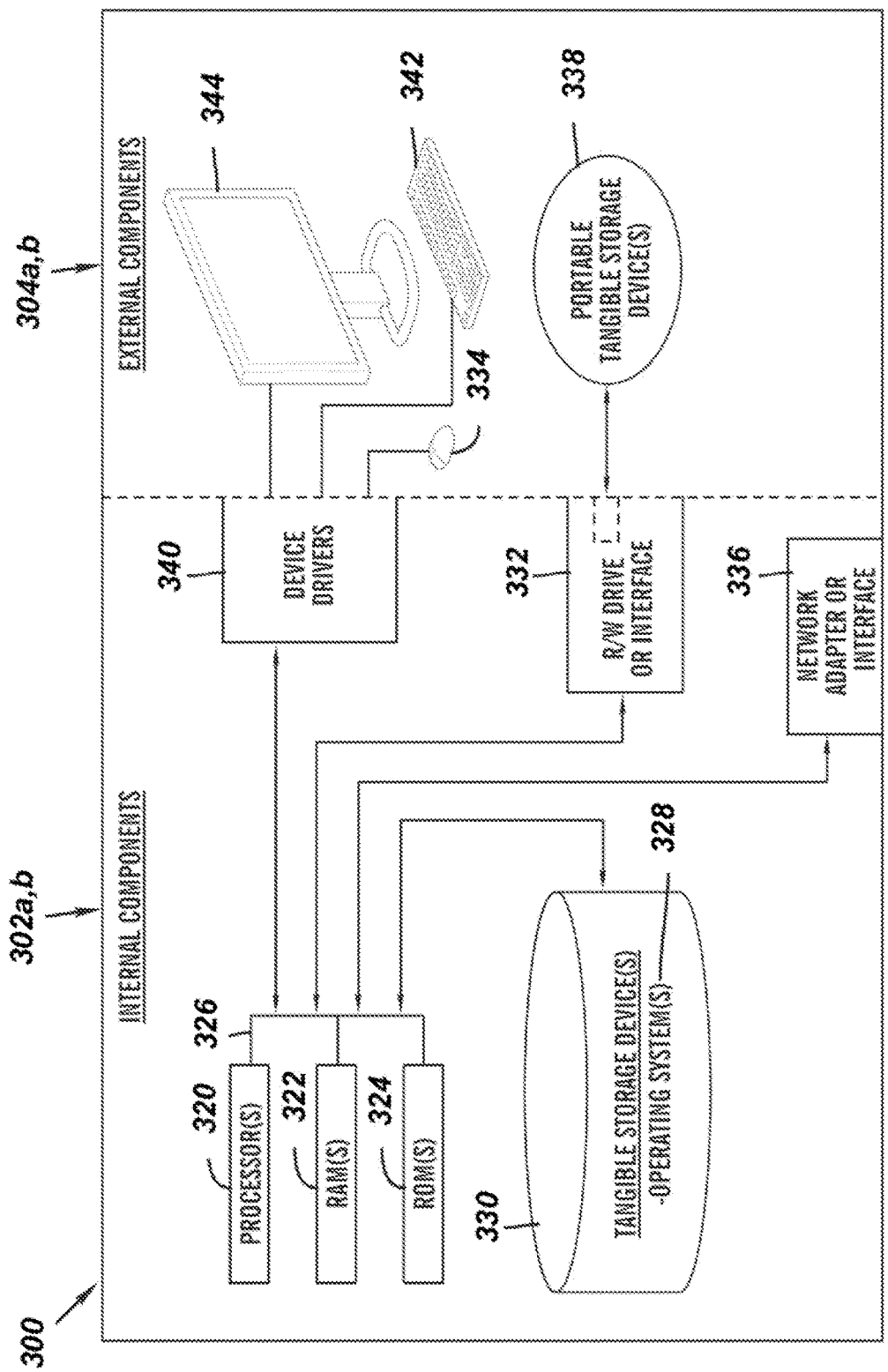
FIG. 3 is a block diagram of internal and external components of computers and servers depicted in FIG. 1 according to at least one embodiment.

FIG. 3 is a block diagram 300 of internal and external components of the client computing device 102, the server 112, and the IoT device 118 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102, the server 112, and the IoT device 118 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the augmented reality sound visualization program 110A in the client computing device 102, the augmented reality sound visualization program 110B in the server 112, and the augmented reality sound visualization program 110C in the IoT device 118 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the augmented reality sound visualization program 110A, 110B, 110C, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the augmented reality sound visualization program 110A in the client computing device 102, the augmented reality sound visualization program 110B in the server 112, and the augmented reality sound visualization program 110C in the IoT device 118 can be downloaded to the client computing device 102, the server 112, and the IoT device 118 from an external computer via a network (for example, the Internet, a local area network or other, wide area network) and respective network adapters or interfaces 336. From the network adapters or interfaces 336, the software program 108 and the augmented reality sound visualization program 110A in the client computing device 102, the asynchronous content embedding program 110B in the server 112, and the augmented reality sound visualization program 110C in the IoT device 118 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
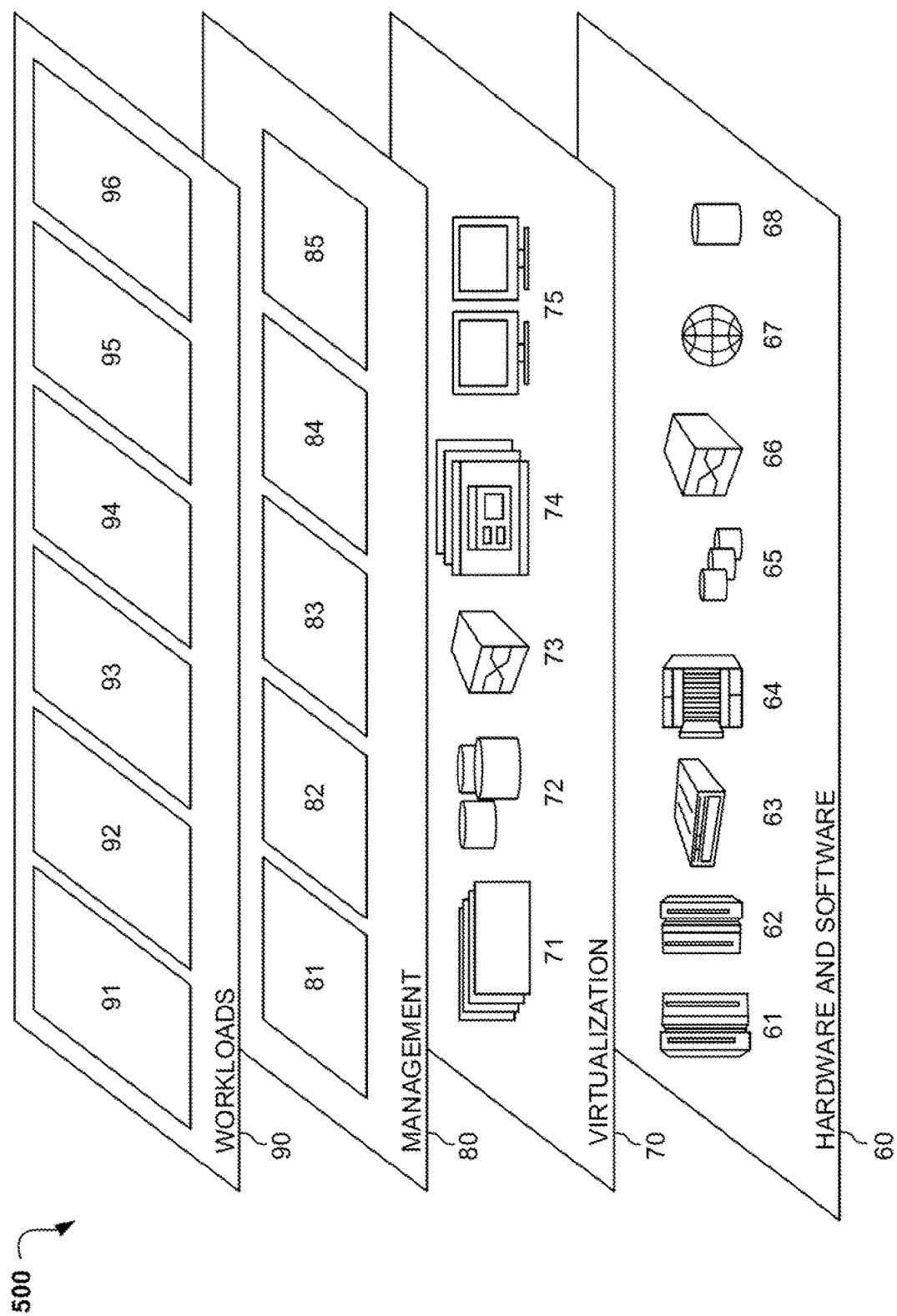
FIG. 5 depicts abstraction model layers according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented reality sound visualization 96. Augmented reality sound visualization 96 may relate to capturing soundwave data from one or more receivers and generating and displaying an overlay of malicious soundwaves in an augmented reality environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
   capturing, by a processor, soundwave data from one or more sensors;
   determining if an emitted soundwave associated with the captured soundwave data is soundwave injurious to a user;
   in response to determining the emitted soundwave is soundwave injurious to the user, generating an overlay for an augmented reality device that visualizes the captured soundwave data;
   displaying the overlay in an augmented reality environment based on the user satisfying a threshold distance to the emitted soundwave; and
   wherein an injurious soundwave boundary of the displayed overlay is determined based on a point at which the emitted soundwave is soundwave injurious to the user.

2. The method of claim 1, wherein the visualized soundwave data comprises a source of the emitted soundwave, an extent to which the emitted soundwave can cause injury to the user, and a severity of the emitted soundwave.

3. The method of claim 2, wherein the severity of the emitted soundwave is represented by an opaqueness of a color with which the overlay is depicted, and wherein the opaqueness of the color varies based on the distance from the emanating source of the emitted soundwave.

4. The method of claim 1, further comprising:
   calculating a recommended path to circumvent the emitted soundwave using a global positioning system and pathing; and
   displaying the recommended path in the augmented reality environment.

5. The method of claim 1, further comprising:
   in response to the user being within the soundwave boundary, determining whether a sound-based cyberattack on a user device is being attempted; and
   in response to determining a sound-based cyberattack on a user device is being attempted, instructing the user device to communicate an execution log and perform defensive or recovery actions of a compromised program or datum.

6. The method of claim 1, wherein the overlay comprises metadata represented numerically or as characters, wherein the metadata is selected from a group consisting of originating direction, soundwave type, intensity, volume, and possible source.

7. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   capturing soundwave data from one or more sensors;
   determining if an emitted soundwave associated with the captured soundwave data is soundwave injurious to a user;
   in response to determining the emitted soundwave is soundwave injurious to the user, generating an overlay for an augmented reality device that visualizes the captured soundwave data;

displaying the overlay in an augmented reality environment based on the user satisfying a threshold distance to the emitted soundwave; and wherein an injurious soundwave boundary of the displayed overlay is determined based on a point at which the emitted soundwave is soundwave injurious to the user.

8. The computer system of claim 7, wherein the visualized soundwave data comprises a source of the emitted soundwave, an extent to which the emitted soundwave can cause injury to the user, and a severity of the emitted soundwave.

9. The computer system of claim 8, wherein the severity of the emitted soundwave is represented by an opaqueness of a color with which the overlay is depicted, and wherein the opaqueness of the color varies based on the distance from the emanating source of the emitted soundwave.

10. The computer system of claim 7, further comprising:
calculating a recommended path to circumvent the emitted soundwave using a global positioning system and pathing; and
displaying the recommended path in the augmented reality environment.

11. The computer system of claim 7, further comprising:
in response to the user being within the soundwave boundary, determining whether a sound-based cyberattack on a user device is being attempted; and
in response to determining a sound-based cyberattack on a user device is being attempted, instructing the user device to communicate an execution log and perform defensive or recovery actions of a compromised program or datum.

12. The computer system of claim 7, wherein the overlay comprises metadata represented numerically or as characters, wherein the metadata is selected from a group consisting of originating direction, soundwave type, intensity, volume, and possible source.

13. A computer program product, the computer program product comprising:
one or more computer-readable tangible storage medium and program instructions stored on at least one of the one or more tangible storage medium, the program instructions executable by a processor capable of performing a method, the method comprising:
capturing soundwave data from one or more sensors;
determining if an emitted soundwave associated with the captured soundwave data is soundwave injurious to a user;
in response to determining the emitted soundwave is soundwave injurious to the user, generating an overlay for an augmented reality device that visualizes the captured soundwave data;
displaying the overlay in an augmented reality environment based on the user satisfying a threshold distance to the emitted soundwave; and
wherein an injurious soundwave boundary of the displayed overlay is determined based on a point at which the emitted soundwave is soundwave injurious to the user.

14. The computer program product of claim 13, wherein the visualized soundwave data comprises a source of the emitted soundwave, an extent to which the emitted soundwave can cause injury to the user, and a severity of the emitted soundwave.

15. The computer program product of claim 14, wherein the severity of the emitted soundwave is represented by an opaqueness of a color with which the overlay is depicted, and wherein the opaqueness of the color varies based on the distance from the emanating source of the emitted soundwave.

16. The computer program product of claim 13, further comprising:
calculating a recommended path to circumvent the emitted soundwave using a global positioning system and pathing; and
displaying the recommended path in the augmented reality environment.

17. The computer program product of claim 13, further comprising:
in response to the user being within the soundwave boundary, determining whether a sound-based cyberattack on a user device is being attempted; and
in response to determining a sound-based cyberattack on a user device is being attempted, instructing the user device to communicate an execution log and perform defensive or recovery actions of a compromised program or datum.

\* \* \* \* \*